United States Patent Office 3,443,549
Patented May 13, 1969

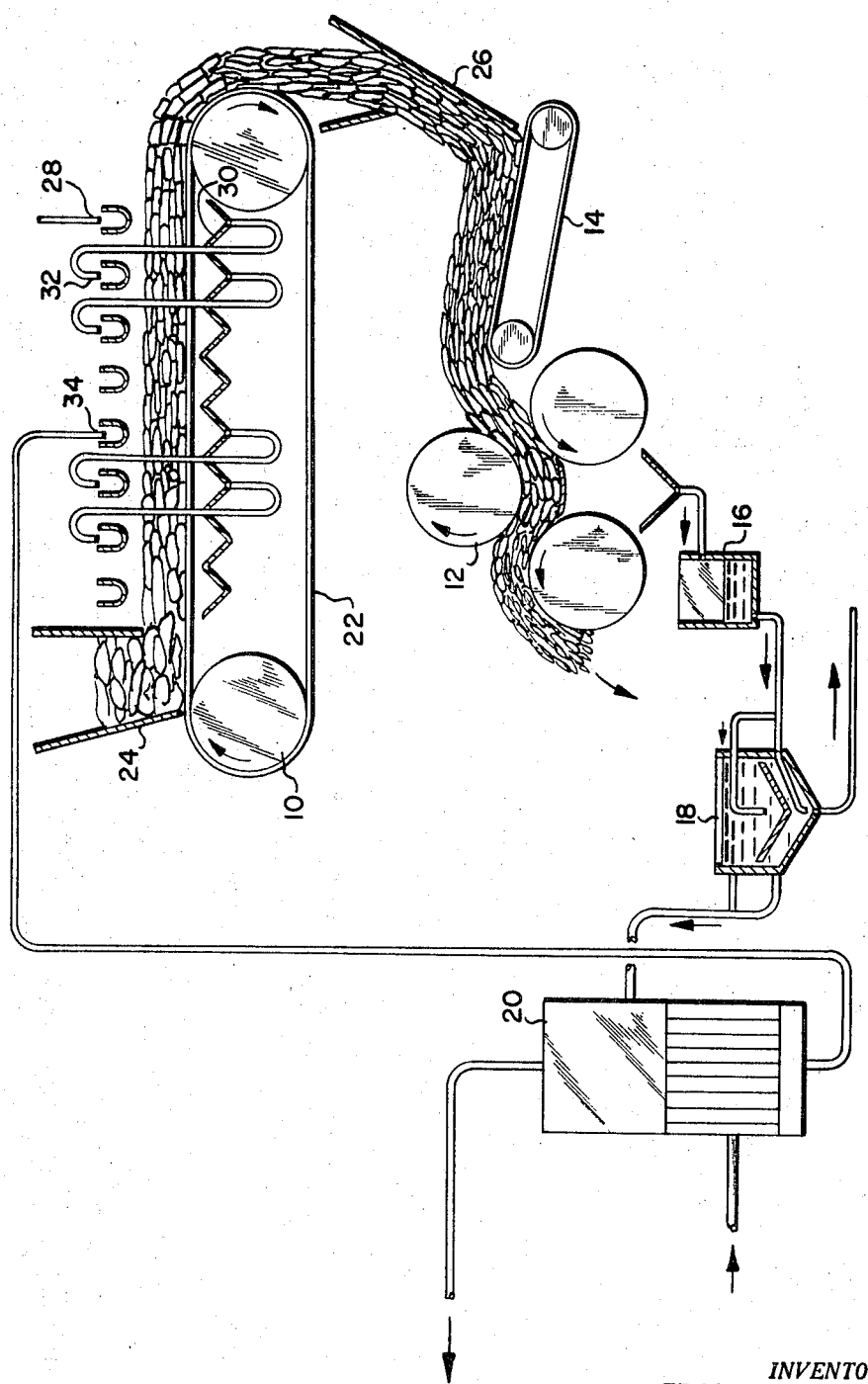

3,443,549
JUICE-EXTRACTING METHOD AND APPARATUS
Francis Dambrine, Lille, Nord, France, assignor to
Societe Fives Lille-Cail, Paris, France
Filed July 28, 1966, Ser. No. 568,583
Claims priority, application France, Aug. 3, 1965,
27,003
Int. Cl. C13d 1/02; B01d 12/00
U.S. Cl. 127—5        10 Claims

ABSTRACT OF THE DISCLOSURE

Apparatus and method in which the sugar-containing material is extracted by passing it under liquid distribution points with the liquid distributed at the successive points being progressively more dilute as the material is further extracted. The exhausted material at the end of the extraction path is then pressed, the press water collected, defecated and concentrated before being returned to one of the intermediate distribution points. The point at which the concentrated liquid is returned is chosen to correspond approximately to the concentration of the liquid in the apparatus near the point of distribution.

---

The invention relates to the extraction of materials, such as juices, which are contained in solids, the extraction being brought about by the use of an appropriate solvent which is circulated through the solids. In particular, the present invention relates to methods and apparatus for the treatment of solid materials which are absorbent to a high degree, such as cane sugar, for example.

According to conventional methods of extracting juices from materials of this type, a large part of the solvent which is used for juice extraction is adsorbed by the solid material and must then be pressed from the latter material so as to extract therefrom the solvent which is contained in the substance from which the juice is extracted.

When the solution which is recovered in this way is of low concentration, it is generally returned to the extracting apparatus at a zone where the concentration in the treated material of the substance to be extracted therefrom is greater than the concentration of the solution recovered by pressing the material, so as to enrich the recycled solution.

Inasmuch as it is desired at all times to draw off from the apparatus a solution of high concentration, so as to reduce the cost of further treatment of the solution as well as the outlay of investments in the apparatus, it is customary to introduce into the juice-extracting apparatus, at a zone where the treated material is substantially exhausted of juices, the less quantity of pure solvent the more solution of low concentration is recovered by squeezing the exhausted materials. Thus, the greater the amount of liquid squeezed from the materials which have already been substantially exhausted of juices, the less the amount of pure solvent which will be initially introduced into the apparatus.

As a result, when the material is of a type which is highly adsorbent, the amount of pure solvent introduced into the zone where the material is substantially exhausted of juices is quite low. As a result, there is a poor moistening of the material at the zone where the relationship of the flow of solvent to the material which is treated is very low. On the other hand, there is a relatively low degree of concentration between the material and the solvent in this zone.

In order to compensate for these latter factors, so as to obtain a desired degree of extraction, it thus has become customary to increase the time during which the solvent and the material from which juice is extracted are maintained in contact so that, as a result, there is an increase in the time during which the treated material remains in the extraction apparatus.

When the material from which the juice is extracted is of plant origin, the increase in the time during which the material remains in the extraction apparatus very frequently results in a degradation of the quality of the material which is to be extracted, and substantial losses may result.

This is particularly true in the case of extraction of juice from sugar cane, where, as a result of the high degree to which it is possible for the cane to absorb liquids, particularly when the sugar cane is cut up or in pulverized form, the relationship between the rate of flow of the solution obtained by pressing the material after extraction of juice therefrom and the pure solvent is on the order of two. It thus becomes customary to increase the time during which the extraction of juice takes place so as to be able to have a suitable extraction of sugar, with the result that there are unavoidable losses of sugar because of the inversion which takes place under the simultaneous action of heat and pH.

It is, therefore, a primary object of the present invention to improve the methods and apparatus presently used for the extraction of juices.

In particular, it is an object of the present invention to provide a method and apparatus which will make it possible to utilize a large rate of flow of solvent in pure form while still avoiding any reduction in the flow and concentration of the solution which is withdrawn from the extraction apparatus.

According to the method of the present invention, the liquid which is squeezed from the material from which juice has been extracted is concentrated so as to increase its content of juices, and it is this concentrated liquid which is recycled so as to re-enter the extraction apparatus at a suitable location. This liquid which is squeezed from the material out of which the juice has already been extracted is initially purified before being concentrated, and the concentration of the purified liquid can take place by evaporation thereof, so that the volume of the liquid is reduced while its degree of concentration is increased.

Inasmuch as the rate of flow of the recycled solution is less than in conventional methods and apparatus, since the solution is more concentrated and has had its initial volume reduced, it becomes possible with the method and apparatus of the present invention, to increase the rate of flow of pure solvent which is introduced into the juice-extracting apparatus, so that for a given extent of extraction of juices the capacity of the apparatus can be reduced as compared to the capacity of known apparatus for extracting the same amount of juice. As a result, the losses with the method and apparatus of the invention are also less than with conventional methods and apparatus.

The method and apparatus of the present invention are illustrated by way of example in the accompanying drawing which forms part of this application and in which one embodiment of a method and apparatus according to the present invention is schematically illustrated in connection with an installation designed for the extraction of juice from cane sugar.

The installation shown in the drawing includes, primarily, a juice-extracting apparatus 10 and a press means 12 made up of three rotary cylinders supplied with material by way of an endless band 14, the installation also including a lime tank 16, a decanter 18, and an evaporator 20.

The juice extracting section 10 is made up of an endless belt 22 which is perforated or otherwise made of a relatively open mesh so as to be permeable to liquid. The upper run of the endless belt 22 transports the cane sugar in pulverized or cut up, divided form, where the sugar cane is in small pieces, from the beginning to the end of a given path with which the upper run of the endless band 22 is substantially coextensive. At the beginning of this path is situated a supply hopper 24 of the particulate material from which juice is to be extracted. After reaching the end of the path determined by the right end of the upper run of the band 22, the material is received in a hopper 26 from which it is discharged onto the endless band 14 which serves to transport the material beyond the end of the path formed by the upper run of the belt 22 to the press means 12. The thickness of the layer of sugar cane carried by the upper run of the belt 22 is adjusted by way of a slide valve or the like situated at the outlet end of the hopper 24 and not shown in the drawing, this adjusting structure being situated at the bottom end of the hopper 24.

During movement of the layer of sugar cane on the upper run of the belt 22, it is sprayed with a suitable solvent so as to be treated according to the countercurrent principle, as described below, and thus the section 10 forms a counterflow means for directing the material from which juice is to be extracted in one direction from the beginning to the end of a given path while directing the solvent in the opposite direction from the end toward the beginning of the path while repeatedly passing the solvent through the material from which the juice is to be extracted. At the discharge end of the counterflow means or juice extraction section 10, the sugar cane is directed downwardly into the discharge hopper 26 from which it is directed onto the transporting means 14 which carries the material, now substantially depleted of juices, to the press 12.

Because of the highly absorbent properties of the particular material which is treated, such as sugar cane, although the juices have been extracted to a large extent therefrom, the material still contains a considerable amount of solvent plus a certain amount of residual juice, and in the press 12 the absorbed sugar solution which still remains in the pulp is extracted by squeezing the exhausted sugar cane. The solution which is recovered in this way is purified by being treated with lime in the tank 16 where the pH of the solution is given a value favorable for flocculation, and then the solution is decanted in the decanter 18.

After the liquid which has been squeezed from the pulp in this way has been purified in the above-described manner, the extent of concentration of the sugar solution which forms this liquid is increased in an evaporator 20. This evaporator is supplied with steam withdrawn at a predetermined level from a multiple-purpose evaporator installation where the concentration of the sugar solution withdrawn from the juice extracting section 10 is carried out. The steam produced in the evaporator 20 can in this case eventually be recovered at a suitable level in the multiple-purpose evaporator installation. It is also possible to supply the evaporator with steam derived from this installation and normally transmitted to a condenser. In this latter case, the evaporator will function at a relatively low hydrostatic level and will be, for example, a pressure-dropping unit which is of a type which lends itself very well to this purpose.

The concentrated solution derived from the evaporator 20 is used for spraying the layer of sugar cane at the counterflow means 10. The spraying takes place countercurrent to the movement of the sugar cane, as indicated above, so that the pure solvent, which may be water, is introduced at 28 onto the layer of sugar cane in the region of the end of the path determined by the upper run of the belt 22, where the cane substantially depleted of juices is about to be received by the hopper 26. A part of the solvent is absorbed into the sugar cane while the remainder thereof filters through the layer of sugar cane and is received in a collector 30 from where it is pumped and again directed through the layer of sugar cane, at the location 32 which is nearer to the beginning of the path of movement of the layer of sugar cane than the location 28 where the pure solvent is initially applied to the sugar cane. In this way, the collected solution is repeatedly pumped and directed through the layer of sugar cane at successive locations which are progressively located nearer to the beginning of the path where the supply hopper 24 is located.

At each successive pass of the solvent through the layer of sugar cane, the solution becomes enriched to an increasing degree in sugar, and of course at each location where the solution passes through the layer of sugar cane the extent of concentration of sugar in the layer of sugar cane is greater than in the solution, so as to assure a continuous increase in the extent of concentration of the solution and in the progressive extraction of sugar from the sugar cane.

The concentrated solution derived from the evaporator 20 is directed to the layer carried by the upper run of the belt 22 at the location 34 which is situated at a point where the concentration in the sugar cane is greater than that in the solution, and the recirculated concentrated solution, derived from the evaporator 20, now will progress in the same way as the pure solvent toward the beginning of the path of movement of the sugar cane in countercurrent to the direction of movement thereof, as pointed out above.

It is apparent that by concentrating the solutions derived from the press 12, there is a reduction in the supply of recycled solution which enables the supply of pure solvent, which is directed to the layer of sugar cane, to be increased, with the result that a superior extraction is achieved.

It is furthermore evident that the method of the invention is not only useful in connection with extracting installations of the type described above, and also that the apparatus shown can be replaced by other known apparatus fulfilling similar functions.

Moreover, it is emphasized that the method of the invention is useful in all cases where it is necessary to extract a substance from a solid material, which has a high degree of adsorption, by means of a pure solvent and a solution of relatively low concentration.

What is claimed is:

1. In a juice-extracting method, the steps of directing from the beginning to the end of a given path material from which juice is to be extracted while simultaneously directing repeatedly through the material in countercurrent to the direction of movement thereof a solvent which extracts juice from the material, said solvent being introduced adjacent the end of said path and becoming gradually richer in juice extracted from the material as the solvent progresses toward the beginning of the path while the material from which juice is to be extracted becomes depleted of juice to an increasing degree as it advances from the beginning to the end of said path, transporting the material substantially exhausted of juice beyond said end of said path, squeezing the material thus transported beyond said end of said path to extract from the latter material at least a substantial portion of the liquid retained therein when the material reaches the end of said path, concentrating the latter liquid, and then recycling the thus-concentrated liquid back through material advancing along said path.

2. The method of claim 1 and wherein the recycled, concentrated liquid is introduced to the material at a location between said beginning and end of said path, so that substantially only pure solvent is initially directed through the material adjacent the end of said path.

3. The method of claim 1 and wherein said liquid derived from squeezing the material which is transported beyond said end of said path is concentrated by evaporation so as to reduce the volume of the liquid while simultaneously increasing the concentration thereof.

4. The method of claim 1 and wherein the material transported beyond said end of said path is purified before being concentrated and recycled.

5. In a method as recited in claim 1, said material from which juice is extracted being of plant origin.

6. In a method as recited in claim 1, said material from which juice is extracted being sugar cane.

7. In a juice-extractor, counterflow means for directing material from which juice is to be extracted from the beginning to the end of a given path while simultaneously passing repeatedly through the material a solution which extracts juices from the material, said counterflow means directing the solution repeatedly through the material in countercurrent to the movement of the material from the beginning to the end of said path, so that as the solution approaches the beginning of said path it becomes enriched to increasing degree with juice extracted from the material while the material becomes depleted of said juices to an increasing degree as the material approaches said end of said path, press means, transporting means communicating with said end of said path and with said press means for directing the material substantially depleted of juices from said end of said path to said press means, said press means squeezing from the material liquid contained therein, concentrating means receiving the liquid squeezed from the material by said press means for concentrating the liquid, and recycling means communicating with said concentrating means and with said counterflow means for recycling the concentrated liquid through the material advanced from said beginning toward said end of said path by said counterflow means.

8. The combination of claim 7 and wherein a purifying means is situated between said press means and concentrating means for purifying the liquid before it is concentrated by said concentrating means.

9. The combination of claim 7 and wherein said recycling means introduces the concentrated liquid back into said counterflow means at an intermediate location situated between the beginning and end of said path.

10. The combination of claim 7 and wherein said concentrating means is in the form of an evaporator which evaporates the liquid to reduce the volume thereof while concentrating the same.

References Cited

UNITED STATES PATENTS

| 3,047,430 | 7/1962 | Goodban et al. | 127—3 X |
| 3,113,027 | 12/1963 | Learner et al. | 23—270 X |
| 3,248,263 | 4/1966 | Silver et al. | 127—4 X |
| 3,275,472 | 9/1966 | Tantawi et al. | 127—5 |
| 3,313,653 | 4/1967 | Jung | 127—4 X |

MORRIS O. WOLK, *Primary Examiner.*

D. G. CONLIN, *Assistant Examiner.*

U.S. Cl. X.R.

23—270; 127—3, 43, 45